A. RAHN.
NUT LOCK.
APPLICATION FILED OCT. 27, 1908.

986,217.

Patented Mar. 7, 1911.

Witnesses:—
Joe. P. Waller.

Inventor
Albert Rahn.
By Victor J. Evans,
Attorney

UNITED STATES PATENT OFFICE.

ALBERT RAHN, OF NEUSTADT, ONTARIO, CANADA.

NUT-LOCK.

986,217.

Specification of Letters Patent. Patented Mar. 7, 1911.

Application filed October 27, 1908. Serial No. 459,767.

*To all whom it may concern:*

Be it known that I, ALBERT RAHN, a subject of the King of Great Britain, residing at Neustadt, in the Province of Ontario and Dominion of Canada, have invented new and useful Improvements in Nut-Locks, of which the following is a specification.

My invention relates to improvements in nut locks, and the object of the invention is to devise a very simple form of lock, which will be incorporated for the most part in the nut itself and thereby not be liable to be lost.

A further object is to make the device so simple and cheap that it will practically add nothing to the cost of the nut.

To effect these objects I have constructed a bolt, with a longitudinal slot and the nut with spicular projections extending from the sides beyond the outside face, one of said spicular projections being designed to be bent downwardly into the slot when the nut has been screwed home, as hereinafter more particularly explained.

Figure 1:
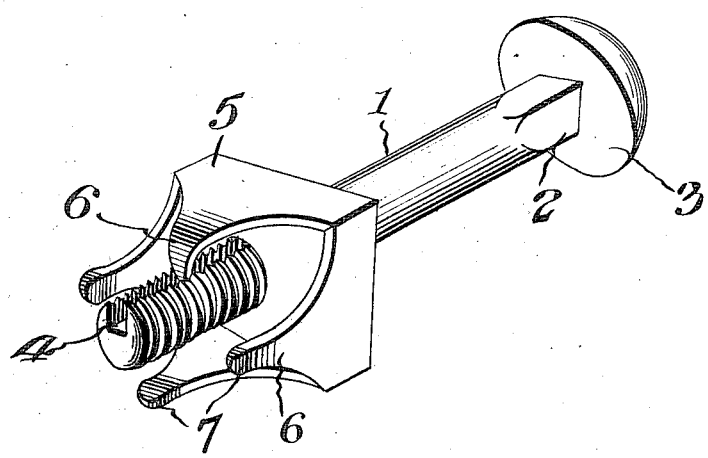
Figure 2:
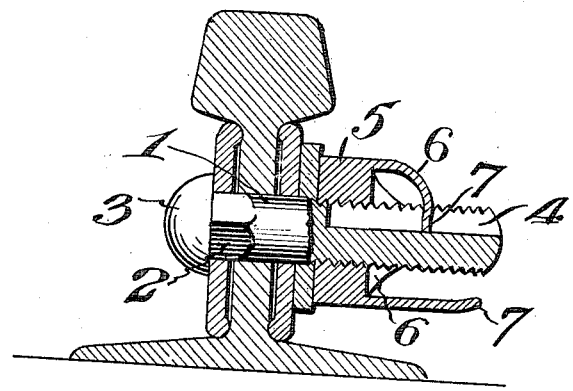

In the accompanying drawing there has been illustrated a simple and preferred embodiment of the invention and in which:

Figure 1 is a perspective view illustrating the nut in locked position upon a bolt. Fig. 2 is a transverse sectional view illustrating the improvement secured upon the fish plate of a rail.

In the accompanying drawing the numeral 1 designates an ordinary bolt having a squared portion 2 adjacent its head 3 and having its threaded portion provided with a longitudinally extending channel 4.

The numeral 5 designates the locking nut. This nut 5 is of ordinary form, being provided with a central threaded bore adapted to engage the threads of the bolt 1. The nut is preferably formed up in a drop forging with outwardly extending spicular projections or fingers 6. The fingers 6 are positioned upon each of the faces of the nut, extending from the edges of the said faces in an inwardly curved or arcuate line and terminating in a lip portion 7 approximately equaling or slighter than the width of the channel 4 provided by bolt 1.

It will be observed that the fingers or projections 6 on the body portion of the nut are of substantially triangular form and tapered at their outer ends to freely bend so that the said fingers may be bent inwardly toward the bolt when the nut is engaged therewith whereby one of the said fingers will engage in the groove in said bolt and afford a space between the outer face of the nut and the said fingers, the space of the said space being for any purpose desired, for instance, should a check nut be employed it will be received within the said space between the fingers and the outer face of the nut.

Such a nut as I have described is simple and cheap to manufacture, very easily applied, as there are no extra parts, and the device is incorporated namely, in the nut, itself, being always ready for application.

Having thus fully described the invention what is claimed as new is:

The combination with a bolt having a longitudinal groove in its stem, of a square-shaped nut threaded on said bolt, and outwardly tapering resilient fingers struck up from the outer face of said nut at its four side faces, any one of said fingers being adapted to be bent inwardly in an arc to engage in the groove in the bolt for locking the nut on the latter.

In testimony whereof I affix my signature in presence of two witnesses.

ALBERT RAHN.

Witnesses:
WM. ROBERTSON,
JNO. MILLS.